E. C. ALBREE.
ACCOUNTING SYSTEM.
APPLICATION FILED FEB. 21, 1905.

902,542.  Patented Nov. 3, 1908.

E. C. ALBREE.
ACCOUNTING SYSTEM.
APPLICATION FILED FEB. 21, 1905.

902,542. Patented Nov. 3, 1908.

Witnesses:
J. Henry Parker
Robert Wallace

Inventor:
Edward C. Albree,
by MacLeod, Calvey, Cushman & Dike.
Attorneys.

E. C. ALBREE.
ACCOUNTING SYSTEM.
APPLICATION FILED FEB. 21, 1905.

902,542.

Patented Nov. 3, 1908.

Witnesses:
J. Henry Parker
Robert Wallace.

Inventor:
Edward C. Albree
by Macleod, Calver, Cushman & Dike
Attorneys.

E. C. ALBREE.
ACCOUNTING SYSTEM.
APPLICATION FILED FEB. 21, 1905.

902,542.

Patented Nov. 3, 1908.

Witnesses:
J. Henry Parker
Robert Wallace

Inventor:
Edward C. Albree
by Macleod, Calver, Cushman & Dike
Attorneys.

E. C. ALBREE.
ACCOUNTING SYSTEM.
APPLICATION FILED FEB. 21, 1905.

902,542.

Patented Nov. 3, 1908.

Witnesses:
J. Henry Parker
Robert Wallace

Inventor:
Edward C. Albree
by MacLeod, Calver, Cushman & Dike
Attorneys.

UNITED STATES PATENT OFFICE.

EDWARD C. ALBREE, OF SWAMPSCOTT, MASSACHUSETTS.

ACCOUNTING SYSTEM.

No. 902,542.  Specification of Letters Patent.  Patented Nov. 3, 1908.

Application filed February 21, 1905. Serial No. 246,748.

*To all whom it may concern:*

Be it known that I, EDWARD C. ALBREE, a citizen of the United States, residing at Swampscott, county of Essex, State of Massachusetts, have invented a certain new and useful Improvement in Accounting Systems, of which the following is a specification, reference being had therein to the accompanying drawings.

My invention has for its object to provide a system of cost accounting for use in factories, mills, stores, and similar places where it is desirable to know the value of the amount of labor or material used in the production of any given article, or set of articles.

The invention is also applicable to other places where similar records are desirable.

Heretofore it has been the practice to use order cards upon which each workman writes down the amount of labor expended by him upon the job represented by the order card, the total of these entries being the total labor performed upon that order. In the same way the amounts of material employed upon the order are also recorded. It has been found, however, in the employment of this and similar systems that an immense amount of unproductive labor is required to make up the order cards and that discrepancies arise between the total amount of money paid out for labor in the factory and the total amount charged up for labor against the various pieces of work upon which labor has been performed, so that the value of the information obtained by the use of these systems is much impaired.

My invention provides a convenient means of keeping the record of the labor and material put upon the various orders, and also has the advantage of being substantially a balanced double-entry system. The system is especially adapted for use by illiterate workmen, it being unnecessary for the workman to make or read any figures upon the cards. Furthermore, the total amount of work or material previously applied by the workmen to a given order is instantly apparent to any person who picks up the card. It is also found that a very small amount of unproductive labor is required to operate my improved system of cost accounting.

In an application filed by me November 16 1904, Serial Number 232,930, I have shown and described a cost accounting system which embodies one particular form of my present invention, which I believe to be a very broad one and to cover a variety of modifications, all within the spirit of the invention. In this specification I have also described a number of special features which I believe to be patentable and which I intend to make the subject matter of subsequent applications.

The present invention will be understood from the following specification taken in connection with the accompanying drawings and the novel features thereof are pointed out and clearly defined in the claims at the end of this specification.

Referring to the drawings.

Throughout the drawings where long columns of numerals appear I have thought it necessary to put in only a sufficient number of these numerals to make their arrangement clear.

Figure 1:
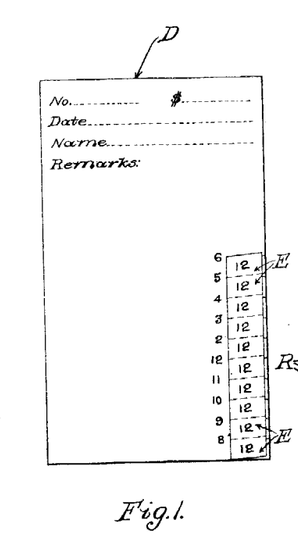
Figure 1 is a view of a workman's time card, adapted for use by a workman receiving ten cents an hour and having coupons or value-indicators sufficient for one day's labor.
Figure 8:
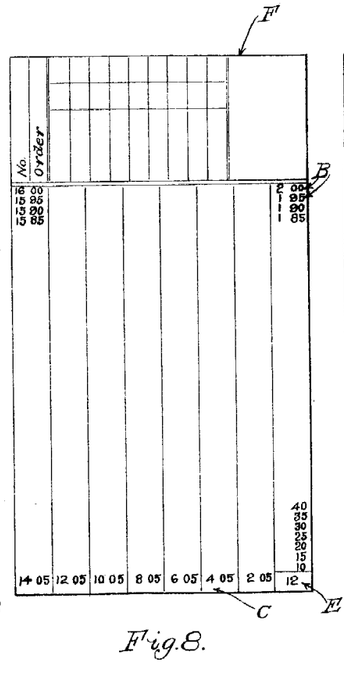
Fig. 8 is an order card having one coupon from a workman's time card attached thereto.
Figure 9:
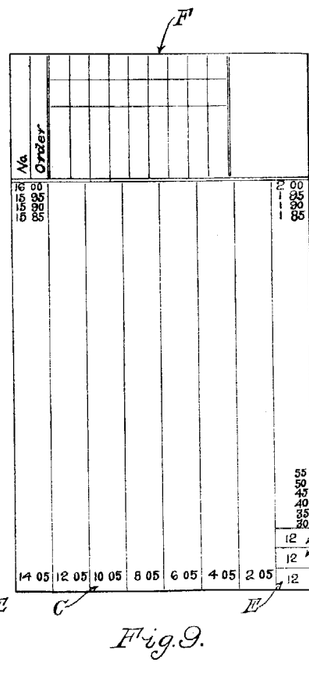
Fig. 9 shows the same order card with a second coupon attached thereto.

When the workman arrives at the factory in the morning, he receives from the timekeeper or other suitable person the time card bearing his number and having coupons thereon, as for instance the one seen in Fig. 1. He also receives an order card like those shown in Figs. 7, 8 and 9 telling him what job he is to begin work upon. When the work on that order card is completed he receives a second order card for the next piece of work, and so on throughout the day.

Figure 7:
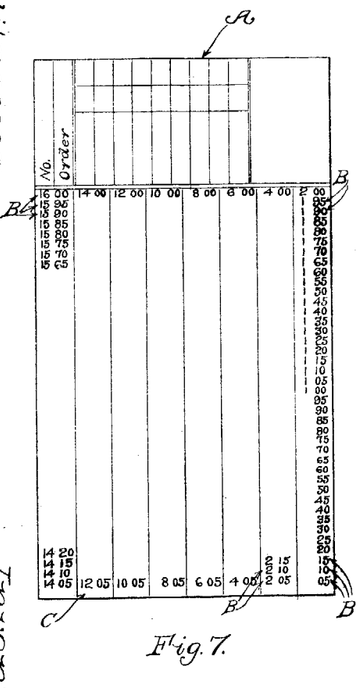
Fig. 7 is an order card.

Referring to Fig. 7 there is shown an order card A, provided with numbered spaces B thereon, each space having an arbitrary value of five cents. Each of these spaces B is numbered progressively, beginning at the lower right hand corner, so that the number in each space indicates the total value of all the spaces preceding it. It will thus be seen that the lowest space B is provided with the figures .05 and the second space B which is the third from the bottom is provided with the figures 10, the eighth from the bottom is numbered 35 and so on. The space at the top of the first right hand column is marked 2.00, and the second space at the bottom of the next right hand column is marked 2.05. I denominate these numerals which I have just described "total figures". Any desired unit or multiple of units may be used. On the card just described the unit is five cents, but this may be varied. It is thus seen that there is left across the bottom of the order card at the bottom of each of the columns thereon, a blank space C, the purpose of which will be hereinafter more fully explained. At the top of the order card, and above the numerals, are left blanks for the name and number of the order, and for any other information which it may be convenient to have upon the card. Upon the back side of the card may be placed instructions to the workman for performing the particular job, if such instructions are deemed necessary.

The workman's or labor card may be made in various forms, as shown by Figs. 1, 2, 3, 4, 5 and 6. Referring first to Fig. 1, which is the simplest form of workman's card known to me, it will be seen that this card D is provided with a series of coupons E attached at one edge to the card, and at another edge or edges to the adjacent coupons E. Each of the coupons E is stamped with the number of the workman, as for instance 12. This card is intended for use by a workman receiving ten cents per hour, and is therefore provided with coupons of a width equal to the width of each of the spaces on the order card A (Fig. 7) and of a height equal to the height of two of the said spaces on the order card. If the workman received five cents per hour the coupon E would be the height of one of the said spaces. It will thus be seen that if one of the coupons E is detached from the workman's card and placed upon the order card F (see Fig. 8), the said coupon will cover up spaces amounting to the value of ten cents upon the said order card F. The order card will thus show that workman No. 12 did work upon that order amounting to the value of ten cents.

When the first coupon is placed upon the order card F it is located so that it covers the space C below the lowest numbered space marked .05, as well as the space marked .05, so that the first numbered space which shows above the edge of the coupon E will be the one marked 10, which represents the total value of the labor done by the workman upon this card. As more work is done upon the order more coupons are added, the second coupon being placed above and adjacent the first coupon (see Fig. 9), where coupons E to the value of twenty cents have been added to the card shown in Fig. 8 so that the total value of the labor done upon the card is shown to be thirty cents, as seen from the numeral 30 which appears in the space next above the top edge of the coupons E last added to the card.

Figure 4:
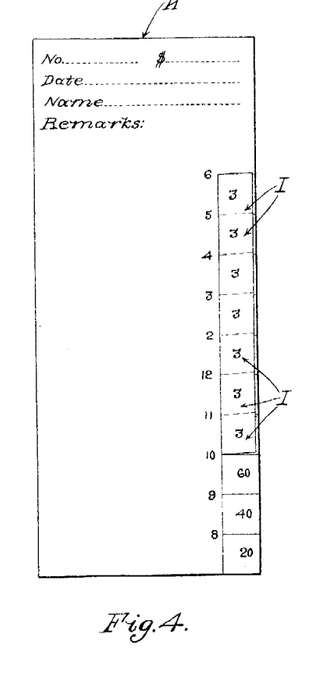
Fig. 4 is a workman's card similar to the card shown in Fig. 1, but good for a workman receiving twenty cents per hour.

Referring now to Fig. 4, there is shown in that figure a workman's time card H, intended for use by a workman who receives twenty cents per hour. It is provided with coupons I, each of them having a value of twenty cents and therefore of twice the height of the ten cent coupons E (see Fig. 1). It is evident that each one of the coupons I of Fig. 4 will cover four of the five cent spaces on the order cards shown in Figs. 7, 8, and 9. Each of the workman's cards shown in Figs. 4, 5 and 6 are provided with sufficient coupons for one day.

Figure 5:
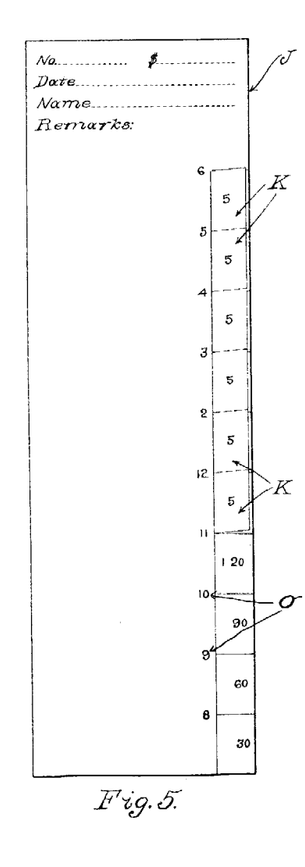
Fig. 5 is a workman's card for a workman receiving thirty cents per hour, showing the total figures underneath the coupons.
Figure 6:
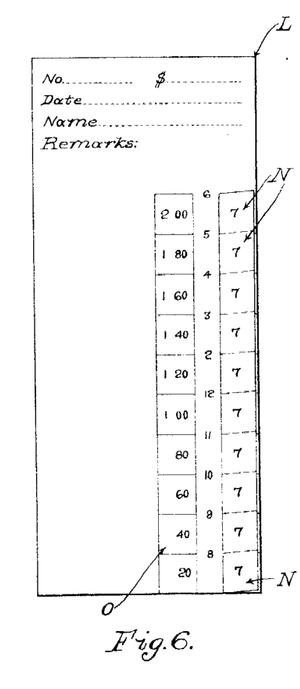
Fig. 6 is a modification of the card shown in Fig. 5 with the total figures arranged differently.

In Fig. 5 is shown a workman's card J for a workman receiving thirty cents per hour, each of the coupons K thereon being equal in height to six of the spaces on the corresponding order cards. Other sizes of coupons are provided for workmen receiving other sums of money per hour, the height of the coupons being proportionate to the amount received.

In actual practice I find it convenient to have the coupons or value indicating means detached from the workman's card and placed upon the various order cards by an inspector, or other convenient person, and since workmen who receive different amounts of money per hour of work have cards differing only slightly in appearance from each other I also find it convenient to provide each workman's card with a set of figures which enable the inspector to detach the right number of coupons from the card at any given time without having to figure up the number of hours or the cash value of the work done. For convenience I have denominated these figures "hour numerals". Modifications thereof appear in the material and piece work cards hereafter described and in the claims I have used the term "hour numerals" to apply to all such numerals.

In describing this feature I will suppose that the factory in which the order and workmen's time cards are to be used, opens at seven o'clock runs until six o'clock with an intermission of one hour from twelve to one. Upon card D (see Fig. 1) I place a set of numerals adjacent the division lines between the coupons E. The numeral 8 is placed beside the line of the upper edge of the lowest coupon E, the numeral 9 beside the corresponding line of the second coupon E; and so on as shown in Fig. 1, omitting, however, the numeral 1, since no work is done in the factory between twelve and one. When the workman comes to the inspector, having done a piece of work, the inspector detaches the coupons remaining upon the card below the line indicated by the hour at which the workman presents his card. If the workman comes at 11 o'clock the coupons below the line indicated by the numeral 11 are detached, showing that he has done four hours' work on the job. By this arrangement of hour numerals the inspector is enabled to detach the correct number of coupons from the workman's card by looking at the clock to see the time and then removing the coupons below the number nearest to the time shown by the clock. In this way the inspector is saved all figuring and mental calculation. I also find that this system largely prevents mistakes as to the number of coupons to be removed from the workman's card. At the end of the day as the workman leaves the factory he hands his card to the time keeper and upon the pay-day he receives pay for his work according to the number of coupons detached from his card.

In order that the timekeeper may determine the amount of labor which each workman has done at the end of the day without any calculations, I place another set of numerals upon the workman's time card adjacent the coupons or value-indicators and corresponding thereto. These numerals I denominate "total figures" and they are used in a variety of ways throughout my improved accounting system. One arrangement of these numerals is to be seen in Fig. 6 where the card L is shown as provided with coupons N, next to which are placed the hour numerals before described, and next again to these are the progressively arranged total figures. In the card shown in Fig. 6, the workman receives twenty cents per hour. Accordingly, the figure 20 appears in the space opposite the lowermost coupon; the figure 40 in the space opposite the second coupon, and so on. If three coupons are detached it will be seen by looking across to the column of total figures that labor to the value of sixty cents is represented by the detached coupons. Another arrangement of these numerals is seen in Fig. 5, where the numerals giving the total labor are arranged underneath the coupons or value-indicators. In that figure the hour-numerals are arranged as shown at o and the total figures are printed directly upon the surface of the cards underneath the coupons, being visible when the coupons are removed. In this case I have shown the card J as provided with coupons for a workman earning thirty cents an hour, and have shown the four lowermost coupons as removed, the card thus representing that the workman worked from seven until eleven o'clock and has done work to the value of one dollar and twenty cents. These total figures may also be arranged upon the back of the card when used with my "punching" system which will be hereafter described. An example of this arrangement is to be seen in Figs. 12 and 13, where there is shown a workman's time card P for use with my improved punching system, the said card being provided with spaces Q and corresponding hour numerals upon the front and total figures Q' upon the back. The card is shown as punched at $Q^2$ at two o'clock, showing by the total figures upon the back next above the punch mark $Q^2$ that the workman has earned $1.20.

In order that the total figure may not be obliterated by the punch mark I start the said total figures with the second space from the bottom. By this means the numeral in the space next above the punch mark indicates the total labor which has been done up to that point by the workman. This is the same arrangement as that shown upon the order card of Figs. 7, 8 and 9 previously described, in which the space c is left at the bottom of the card in order that the total figures may not be obliterated by the coupons or value-indicators attached to the card.

Figure 2:
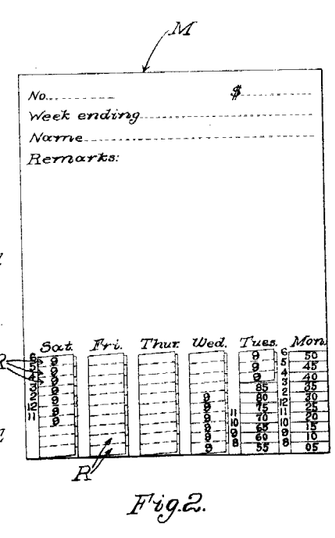
Fig. 2 is a workman's card provided with coupons for one week's labor.
Figure 3:
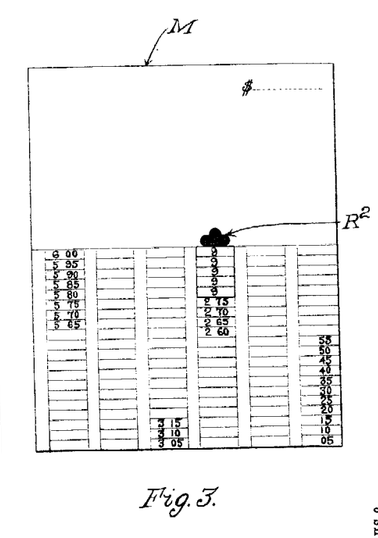
Fig. 3 is a back view of the card shown in Fig. 2.

It is sometimes more convenient in making the workman's time cards to have each card provided with coupons representing a week's work instead of a day's work. In Figs. 2 and 3 there are shown the front and back of a card M provided upon its face with coupons R, each of which represent an hour's work at five cents per hour. These coupons are arranged in columns having over them names of the working days of the week so that each column of coupons represents a day's work. Beneath the coupons in the manner described in connection with Fig. 5 are the total figures and upon the back of the card is another set of figures. I place sufficient total figures upon the back of the card to equal the weekly pay of the workman who receives the largest pay of the workmen using this card. When used by workmen receiving a less amount of pay per week, I place a mark R² by means of a rubber stamp, just above the amount the workman using the card gets per week. In the case supposed in Figs. 2 and 3 it is at $3.00, that being the amount represented by the coupons or value-indicators upon the front of the card. When the workman is sick, or absent from the factory for any reason, the timekeeper detaches the coupons representing the number of hours which the workman has been absent and sticks them on the back of the card beginning at the mark R² and working downward. By this means the timekeeper can tell whether or not the workman has been absent from the factory at all, and if so the total value of the time during which he has worked. He has also a means of checking the coupons which are detached from the workman's card and which represent the pay he is to receive. All of the coupons upon the workman's card are thus accounted for. Those representing his labor are upon the various order cards belonging to the jobs upon which he has worked, and those representing his sickness, or absence from the factory, appear upon the back of the card.

I will now describe the application of my punching system to cards upon which punch marks applied to the divisions on the cards are used for value-indicators instead of detachable coupons. This punching system has certain advantages which make it more convenient for use under certain circumstances, but it involves the same principles as those embodied in the coupon system already described.

Figure 10:
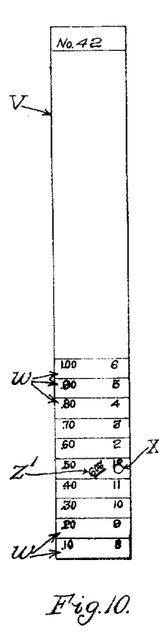
Fig. 10 is a workman's card good for one day, and adapted to be punched.
Figure 14:
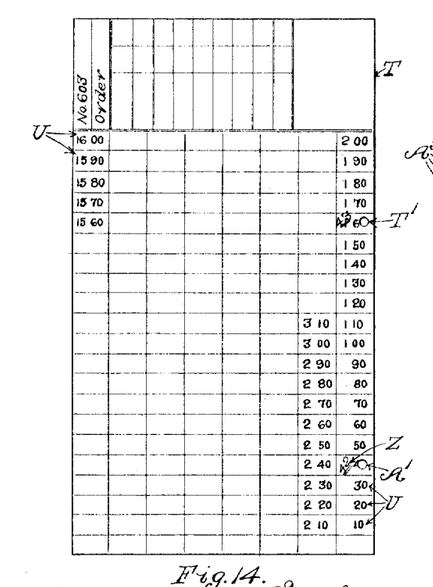
Fig. 14 shows an order card adapted for use with the workman's cards shown in Figs. 10, 11, 12 and 13.

Referring now to Fig. 10 I have shown there one side of a workman's time card V for a man who receives ten cents per hour. In Fig. 14 is shown an order card T for use with the punching system. The order card is provided with spaces U of equal height, each having a value of ten cents. If desired the order card T may be otherwise subdivided, as for instance into spaces having a value of one cent each. The bottom space is left blank, as previously described, and total figures are placed progressively in the spaces beginning with the second one.

The workman's card V shown Fig. 10 is provided with spaces of equal height with the spaces U on the order card T, since the workman is to receive ten cents per hour. The hour numerals are placed upon the card opposite lines of sub-division between the spaces W, and the total figures are placed in the proper spaces adjacent the left hand edge of the card. The card in Fig. 10 is shown as punched at x and indicates that the workman completed a job at twelve o'clock having earned fifty cents.

Figure 11:
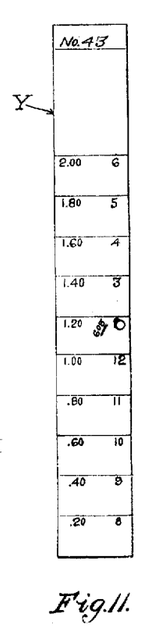
Fig. 11 is a card similar to Fig. 10, but for a workman receiving twenty cents per hour.

In Fig. 11 is shown a similar workman's card y for a workman receiving twenty cents per hour. The lines of division between the spaces are therefore placed twice as far apart as the corresponding lines of division in Fig. 10, and the hour numerals are placed adjacent the lines of division in the usual manner. The card is punched at two o'clock showing that the workman has done six hours work and has earned $1.20. The total figures are placed upon this card in the same way as in the card in Fig. 10.

Figure 12:
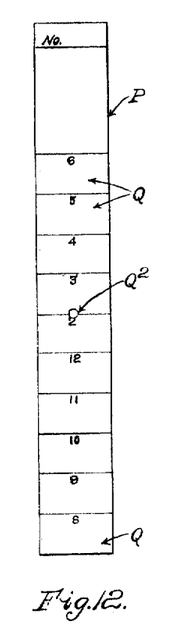
Fig. 12 shows the front, and Fig. 13 the back of a card for a workman receiving twenty cents per hour, and having the total figures arranged on the back.
Figure 13:
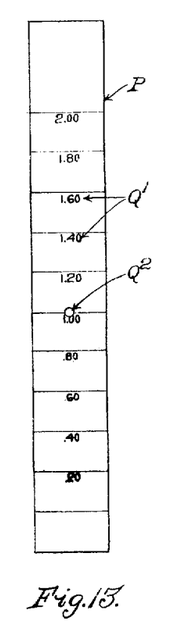

In Fig. 12 is shown the card P, already referred to, in which the totals are placed upon the back of the card. (See Fig. 13.)

Taking now the case indicated by the cards shown in Figs. 10 and 14 workman No. 42 has worked until twelve o'clock upon the job called for by order 603 (Fig. 14). He then goes to the inspector, taking with him the order card T, and his own time card V. The inspector lays the two cards together with the lower edge of the workman's time card V flush with the lower edge of the order card T and punches the two cards at X the point indicated by the hour numeral 12, that being the time at which the workman presented the two cards. The order card then shows fifty cents' worth of work done upon it, and the workman's time card shows fifty cents' worth of work performed by the workman. If it is desired to know what workman performed the labor on the card the inspector places the workman's number 42, as shown at Z, beside the punch mark which has just been made. In the same way if desirable the inspector places the number of the order opposite the punch mark on the workman's time card V as shown by the numerals at Z'. (See also Fig. 10). There may also be written upon the order card if desired the name or number of the operation, as for instance, the word "planing".

Let it be supposed that the next workman to work upon the order card T is number 43, whose card is shown in Fig. 11, and that he works on this order from the time he comes in until two o'clock. At two o'clock he takes his card and the order card to the inspector who lays the workman's time card Y upon the order card T with the lower edge upon the line next above the punch mark A' which has been previously made upon the order card. It being two o'clock the inspector now punches the two cards, placing the punch at the point indicated by the hour numeral 2 on the workman's card. This operation adds six hours' work at twenty cents per hour to the work already done upon the order, and the order card T then shows by the numeral in the space next above the second punch mark T' that a total labor of $1.70 has been performed upon the order. The inspector then marks the card with the workman's number, and the order card number respectively, as has been described in the preceding operation. This method of procedure is carried on as each succeeding workman performs labor upon this order, the total upon the card being at all times readily ascertainable by means of the total figure next above the last punch-mark.

Figure 15:
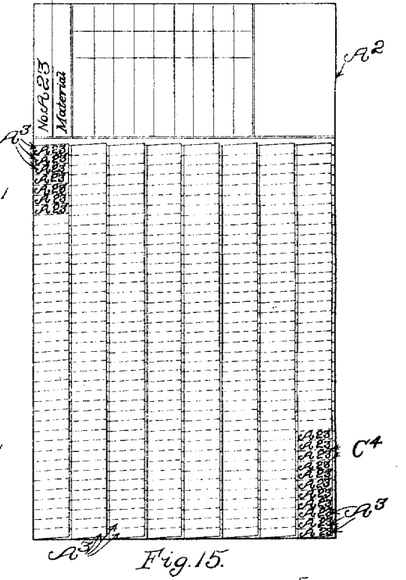
Fig. 15 shows a material card for use with the coupon system.

In the progress of the manufacture of the articles called for by an order, material or supplies are frequently required and the cost of this material enters into the cost of the completed order. My improved system of cost accounting affords means whereby an accurate record of material and supplies used on any order may be easily kept. The means employed will be seen by reference to Fig. 15. In that figure there is shown a card $A^2$ provided with coupons $A^3$, each of which has a value of five cents, the total value of the coupons upon the card representing the total value of the stock of that material in the stock room. When a workman requires stock for the order upon which he is working, he goes to the stockroom, taking with him his record or order card and draws from the stock-keeper what he needs, for instance two pounds at twelve and one-half cents per lb. The stock-keeper detaches five coupons or value-indicators $A^3$ from the card $A^2$ and places those coupons upon the record or order card, as for instance the card shown in Fig. 7. In practice I provide these material coupons, or value-indicators of a different color from the value-indicators upon the various workmen's time cards, so that a person picking up the record card can see at a glance that certain coupons represent labor and certain others material. If desired I also provide the material coupons or value-indicators with a number, as seen at $C^4$ where the number $A^{23}$ appears, that being the number of the material card $A^2$. Beneath the coupons and upon the surface of the card $A^2$ itself, I place the usual total figures, thereby indicating the amount of material which has been given out on the preceding orders, thus enabling the stock-keeper to tell at a glance the amount of stock of any given kind on hand.

It is evident that a similar material card may be arranged for use with my punching system, which I have previously outlined. Such a material card would embody the same principles as those in the card which I have just described. I have, therefore, thought in unnecessary to describe or illustrate it.

Figure 16:
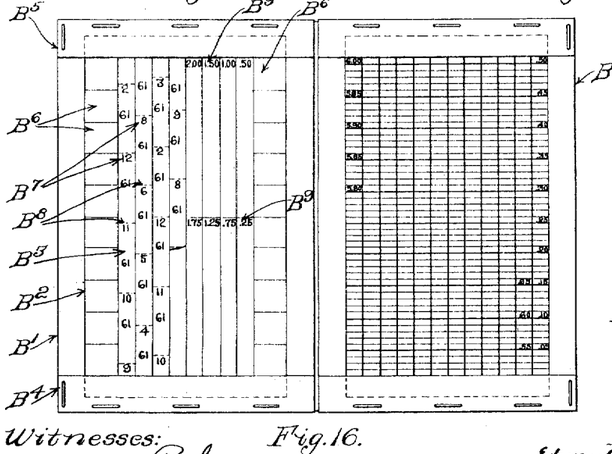
Fig. 16 illustrates a workman's time card book suitable for use with the "strip" system.
Figure 17:
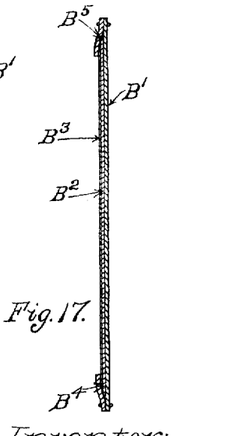
Fig. 17 is a section of the book shown in Fig. 16.

In Figs. 16, 17, 18 and 19 I have illustrated still another embodiment of the principles of my invention which I call for convenience the "strip" system. Referring first to Fig. 16, there is there shown a book $B'$ which may be given to a workman. On the left hand leaf of the book $B'$ I place a card $B^2$ provided with strips or value-indicators $B^3$. I make the cover of the book $B'$ with two pockets $B^4$ and $B^5$ as shown in section in Fig. 17, into which the respective ends of the card $B^2$ are slipped, only that portion between the upper and lower edges of the pockets $B^4$ and $B^5$ being left visible. I find it convenient to make this visible portion of the card five inches long, and so I divide this space into ten equal portions $B^6$. Each strip $B^3$ has a value of fifty cents, the value of the portion of each strip corresponding to one of the spaces $B^6$ is therefore five cents. At proper spaces upon the strip $B^3$ I place horizontal lines $B^8$ across each strip, these lines being located according to the pay per hour, which in the case shown in Fig. 16 is eleven cents per hour. Hour numerals $B^7$ by means of which the inspector who detaches the strip may know the right amount to detach are located adjacent these horizontal lines. Beneath the strips on the card itself, if desired, I place total figures $B^9$ in the manner already described. The total figures and hour numerals operate in exactly the same manner as has been heretofore described. On the right page of the books shown Fig. 16 I place a card with a set of total figures similar to those on the left hand page for the reception of the strips in case of the absence or sickness of the workman, in the manner previously described.

For convenience in manipulating the card I crease, score, perforate or partially detach the strips along the longitudinal lines separating them, and provide their rear surfaces with adhesive material. The strips may be detached from the workman's card by means of scissors or a sharp knife made for the purpose, if desired.

Figure 18:
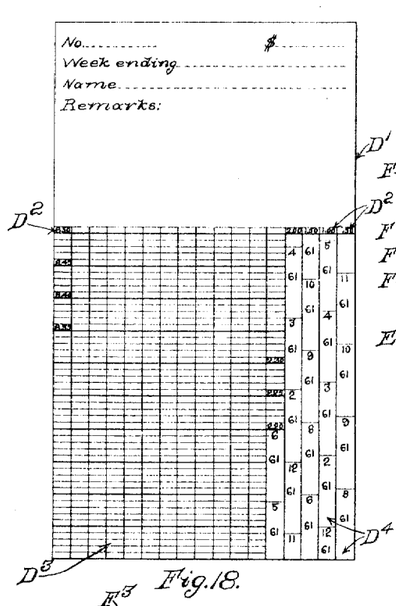
Fig. 18 is an order card adapted for use with the workman's order card shown in Fig. 16.

In Fig. 18 at $D'$ I have shown an order or record card provided with the usual total figures $D^2$ and with the usual blank spaces $D^3$ at the bottom. I have shown on that card strips $D^4$ to the value of $2.20 attached, the same coupons having been detached from the workman's time card shown in Fig. 16, and indicating that workman No. 61, receiving eleven cents per hour has worked twenty hours on the job and receives $2.20 for his work. I find this strip system particularly convenient for use where workmen receive odd sums per unit of time worked, since the system is readily applicable to even fractional sums.

Since it is frequently convenient to be able to compare the amount of labor expended by several workmen in performing the same operation so that the manufacturer may know which of his workmen are the most efficient, and also may be thoroughly informed in regard to the labor performed by them, I provide an embodiment of my invention which for convenience may be called a "comparative order or record system".

Figure 19:
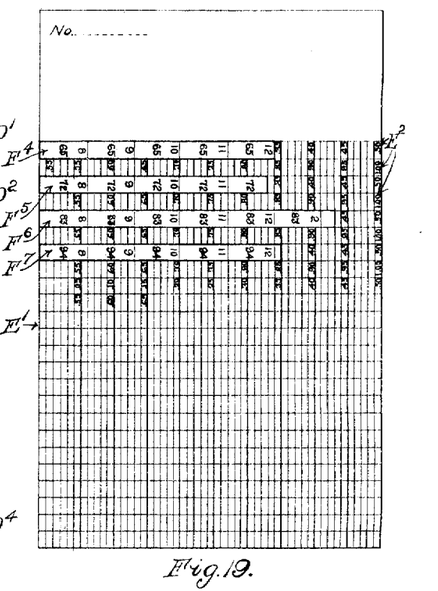
Fig. 19 is a comparative order card.
Figures 20, 21:
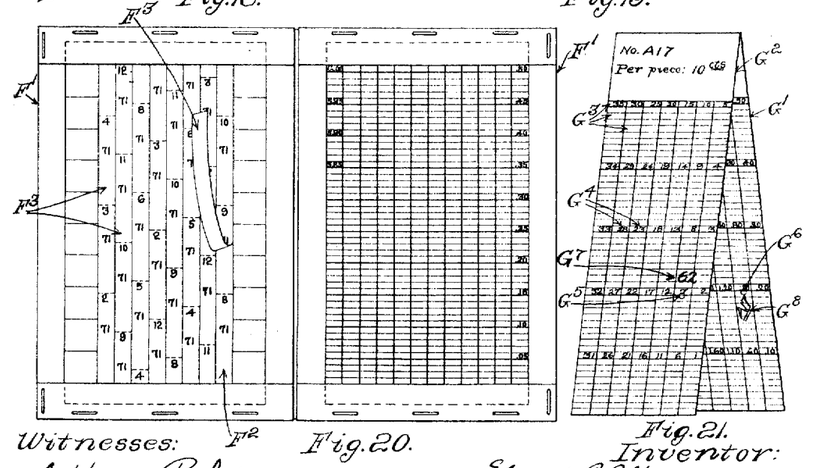
Fig. 20 is a workman's time card book similar to that shown in Fig. 16 but provided with a second set of strips for use with the comparative order card shown in Fig. 19.
Fig. 21 is a piece-work card.

Referring now to Fig. 19 there is there shown a comparative order card $E'$, provided with total figures $E^2$. For use with the comparative order card I furnish the workman's time card, as for instance, the one shown in Fig. 20, with a duplicate set of strips bearing the workman's number. In that figure there is shown a workman's time card F' similar to the one shown in Fig. 16 but provided with duplicate strips F² one of the time or ordinary strips F³ being turned up to reveal the comparative or duplicate strip F² underneath it. This duplicate strip F² is provided with the workman's number to indicate what workman performed the operation. When the inspector removes the value-indicator or time strip F³ from the workman's time card, he also removes the corresponding duplicate strip and places the same upon the comparative order card as shown at F⁴ Fig. 19. In that figure there are shown four duplicate strips F⁴ F⁵ F⁶ and F⁷ attached to the card showing that workmen 61, 72, 83 and 94 performed the same operation and that three of the workmen 65, 72 and 94 expended substantially the same amount of time upon the operation, while one of them 83, expended a very much larger amount of time upon the operation. The exact value of the time expended by each of the workmen is clearly shown by the total figures E². This system of comparative order cards and duplicate value indicators may be employed in connection with my punching and coupon systems heretofore described, if desired.

It frequently occurs in shops that some of the workmen are paid by the piece. It is therefore desirable that the system of cost accounting apply to piece work as well. I have accordingly shown in Fig. 21 one method of applying my improved system to piece work. In that figure there is shown a piece of card board scored and folded to form a pair of cards G' and G² which are arranged to have values indicated thereon by punch marks, and upon which is shown in the figure the record of the manufacture of seven pieces A¹⁷ by the workman 62. The front card G² which for convenience I will call the "ledger card" has its face divided into convenient spaces G³ each of which has a value according to the value of the workman's card G' with which it is used. The spaces G³ on the card G² are numbered according to the amount paid for each piece or hundred pieces, as the case may be. In the figure I have shown the spaces G³ as one cent in value and the pay for each piece as ten cents. There is accordingly placed upon the face of the card G² adjacent the proper lines, numerals G⁴ to indicate the number of pieces made. These numerals correspond to the hour numerals previously described in connection with the workman's time cards. The card G² is provided at the top with the ledger number A¹⁷ of the pieces to be made, and with the price per piece—10 cents. In the drawings, the card is shown as punched at G⁵, the workman having made seven pieces A¹⁷. The two cards G' and G² are punched together, the punch mark G⁶ on the card G' recording the total value in cash of the work done on these pieces and the punch mark G⁵ on the card G² showing that seven pieces at 10 cents per piece have been made. When the inspector punches the cards, having counted the pieces made by the workman, he places the workman's number against the punch mark G⁵, as shown at G⁷ and the piece number A¹⁷ as shown at G⁸, against the punch mark G⁶ on the card G'. The two cards G' and G² are then detached the workman receiving the card G' which he turns in later for his pay, and the card G² being placed in the stock ledger and indicating that seven pieces A¹⁷ were made by workman 62 and placed in stock.

What I claim is:

The combination with a card or slip ruled or marked to provide a column of spaces of equal height, of a plurality of other cards or slips divided into sections, each section being distinctly outlined and bearing a separate symbol whereby it is rendered distinct from the other coupons, and all the sections of one card or slip being of the same height but the sections of different cards or slips being of different heights, every section being equal in height to one or to a plurality of the spaces of the first named card or slip substantially as described.

In testimony whereof I affix my signature, in presence of two witnesses.

EDWARD C. ALBREE.

Witnesses:
GEORGE P. DIKE,
J. HENRY PARKER.